United States Patent
Rose

(10) Patent No.: US 10,564,943 B2
(45) Date of Patent: Feb. 18, 2020

(54) SPECIAL CALLING SEQUENCE FOR CALLER-SENSITIVE METHODS

(71) Applicant: Oracle International Corporation, Redwood Shores, CA (US)

(72) Inventor: John Robert Rose, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 364 days.

(21) Appl. No.: 15/090,347

(22) Filed: Apr. 4, 2016

(65) Prior Publication Data

US 2016/0357586 A1    Dec. 8, 2016

Related U.S. Application Data

(60) Provisional application No. 62/172,405, filed on Jun. 8, 2015.

(51) Int. Cl.
*G06F 9/455* (2018.01)
*G06F 8/41* (2018.01)

(52) U.S. Cl.
CPC .................... *G06F 8/41* (2013.01)

(58) Field of Classification Search
None
See application file for complete search history.

(56) References Cited

U.S. PATENT DOCUMENTS

| | | | |
|---|---|---|---|
| 6,507,946 B2 | 1/2003 | Alexander, III et al. | |
| 7,647,629 B2 * | 1/2010 | Brumme | G06F 9/468 726/21 |
| 8,578,487 B2 * | 11/2013 | Soeder | G06F 21/6227 726/1 |
| 9,690,709 B2 | 6/2017 | Sandoz et al. | |
| 2012/0027195 A1 * | 2/2012 | Shaffer | H04M 3/42221 379/265.09 |
| 2015/0363174 A1 | 12/2015 | Rose et al. | |
| 2016/0011982 A1 | 1/2016 | Sandoz et al. | |
| 2016/0062878 A1 | 3/2016 | Westrelin et al. | |

* cited by examiner

*Primary Examiner* — Kenneth Tang
(74) *Attorney, Agent, or Firm* — Hickman Palermo Becker Bingham LLP

(57) ABSTRACT

In one approach, a method comprises: a virtual machine receiving an invocation instruction from a caller that invokes a callee, wherein the caller represents a first set of instructions and the callee represents a second set of instructions, wherein the invocation instruction is associated with a first set of arguments; in response to receiving the invocation instruction and determining that the callee requires one or more additional parameters to be supplied by the virtual machine, the virtual machine causing the one or more additional parameters to be appended to the first set of arguments to create a second set of arguments; wherein the virtual machine prevents the caller from providing the one or more additional arguments that are to be supplied by the virtual machine; the virtual machine invoking the callee using the second set of arguments.

18 Claims, 8 Drawing Sheets

SPECIAL CALLING SEQUENCE FOR CALLER-SENSITIVE METHODS

RELATED APPLICATIONS

This application claims priority to U.S. Provisional Application No. 62/172,405 filed on Jun. 8, 2015, the entire contents of which is incorporated herein by reference for all purposes as if fully set forth herein.

TECHNICAL FIELD

Embodiments relate generally to handling caller-sensitive methods. Embodiments more specifically relate to determining identifying information of a caller who invokes a caller-sensitive method and securely passing that information to the callee.

BACKGROUND

Caller-sensitive methods are a classification of methods that are able to determine some aspect of the context of the calling instruction from which they were invoked. By contrast, a caller-insensitive method can vary its behavior depending on the argument values passed to it by its caller, but its behavior does not depend on the identity of its caller. A caller-sensitive method can therefore change behavior depending on where the method is called from. Thus, an invocation of a caller-sensitive method from two different sources (e.g. different methods, classes, etc.) can have different results, even if the arguments passed into the caller-sensitive method are identical. For example, in the context of the Java programming language, each class is loaded with a particular Class Loader that determines the namespace utilized by the class. If a method is defined which returns an instance of a class corresponding to a particular name (e.g. passed in as a String argument), the class instantiation returned by the method could be completely different depending on the Class Loader who loaded the caller's class. For instance, the name "Address" in the context of a first Class Loader could refer to a class with fields for street address and zip code, whereas in the context of a second Class Loader "Address" could refer to a class that contains a field representing a memory address. Handling caller-sensitive methods, specifically determining the identity of the caller, involves tradeoffs between security and efficiency.

In one approach, the caller is trusted to supply, to the called method, an additional argument that identifies the caller. This approach is efficient since the identity of the caller is immediately known without many (or any) additional steps being performed to determine the identity of the caller. However, trusting the caller to accurately identify themselves opens up a wide variety of security concerns. For example, an attacker could forge the identity to make the call appear to come from a different source that has a different set of access permissions. As a result, the attacker could potentially obtain private information or capabilities that the attacker would ordinarily be barred from accessing. Thus, trusting the caller to provide their own identity is highly efficient, but that efficiency comes at the expense of security. However, in cases where the caller can be implicitly trusted and security is not a concern, this approach is quick and efficient to implement.

In another approach, the callee or an intermediary (such as a virtual machine controlling the execution) performs a stack walk to scan the data structure maintaining the execution of the program to determine the identity of the caller. For example, in some environments such as the Java Virtual Machine (JVM), each execution of a method pushes a stack frame onto a stack. As a result, the virtual machine can analyze the stack to determine which class is responsible for the previous stack frame. Stack walking is an expensive operation which would have to be performed each time the caller-sensitive method is executed. However, provided that the operating architecture protects the integrity of the stack, the identity of the caller can be accurately determined even if that caller is not trusted. Furthermore, stack walking enables the determination of further ancestors than just the parent caller since that information can be gleaned by performing a deeper inspection of the stack. For example, stack walking allows a trace to be performed even back to the first method executed in the program. Thus, compared to the previously described approach, this approach sacrifices a measure of efficiency for the sake of security and a more robust set of capabilities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
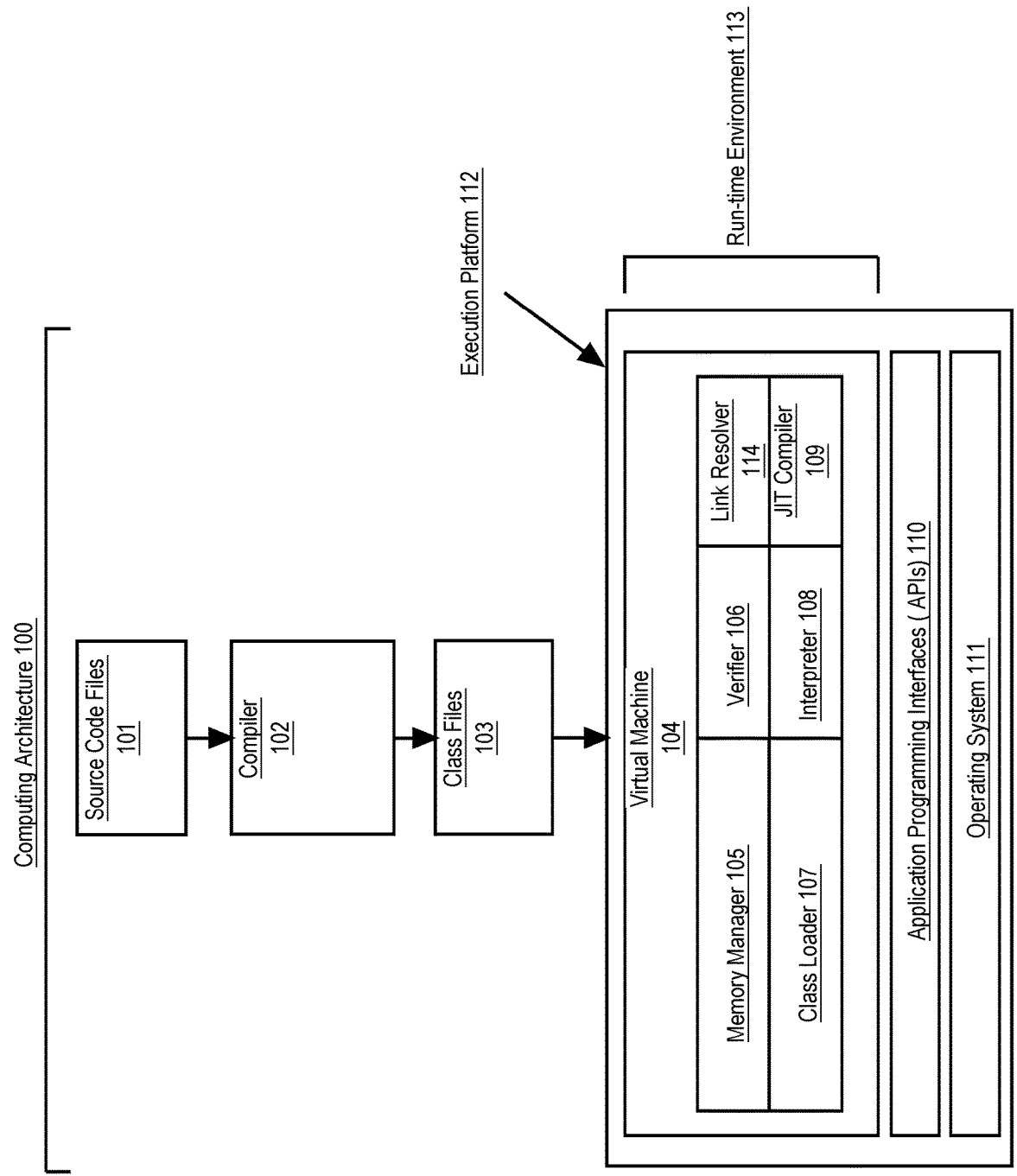
FIG. 1 illustrates an example computing architecture in which techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
   2.1 Example Class File Structure
   2.2 Example Virtual Machine Architecture
   2.3 Loading, Linking, and Initializing
3.0 Caller-sensitive Method Example
4.0 General Process Flow 5.0 Example Caching Process
6.0 Caller-sensitive Method Definitions
7.0 Example Interpreter Process Flow
8.0 Example Compiler Process Flow
9.0 Other Use Cases
10.0 Alternatives for Specifying the Additional Arguments
11.0 Hardware Overview
12.0 Extensions and Alternatives
13.0 Additional Disclosure
1.0. General Overview The techniques described herein use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions". Thus, the term "method" does not to limit the application of the techniques described herein to Java, the JVM, or any particular language or operating environment. Furthermore, the term "method" is also synonymous with the terms "class method" or "object method". A method is a set or block of code which is referred to by name and can be called (invoked) at various points in a program, which causes the method's code to be executed. The term "invoke" is also synonymous with the term "call". Thus, when first method "calls" or "invokes" a second method, this represents that the first method causing the second method to be executed. A point in a program which invokes a method is described variously using terms such as "call site", "invocation instruction", "invoke command", and so forth. A call site occurs within a context which is described as a "class" or "class loader", but the caller information which describes such a context may also distinguish the identities of other containers that may contain code instructions, including "methods", "protection domains", "modules", "load objects", "applications", and so forth.

In an embodiment, caller-sensitive methods are handled by having a trusted third party inject information identifying the caller into the call. For example, the computing architecture could include a virtual machine that is responsible for executing the program. When the caller method invokes the callee method, the virtual machine determines whether or not the callee is caller-sensitive. If so, the virtual machine executes a special linking procedure that links the call and adds an additional argument to that call that identifies the caller. For example, the virtual machine may add the additional argument by pushing the caller identification information onto an operand stack before beginning execution of the callee. In some embodiments, the caller is unable to supply this additional argument directly. For example, the virtual machine may in response to receiving an invocation instruction where one or more of the arguments supplied by the caller correspond to the caller identification information, prevent the call from being performed, such as throwing an exception, generating an error, and so forth. The manner of determining whether the caller has attempted to supply caller identification information may be performed by inspecting metadata associated with the callee, such as a public signature of the callee only allowing specific types of arguments to be passed, annotations associated with the callee specifying the caller sensitive information that should not be provided by the caller, and so forth. Since the identity of the caller is provided by the run-time environment, rather than the caller, the callee can trust that the additional argument accurately identifies the caller. Furthermore, as a consequence of managing execution of the program, the run-time environment already knows the identity of the method that it is presently executing. Thus, pushing that information onto the operand stack while linking a call to another method is a fairly efficiency operation. As a result, the identity of the caller can be provided to the callee in a secure and efficient manner.

In order to provide clear examples, the information that is injected into the arguments when linking the caller to the callee is referred to as "caller identification information" or simply "caller information". However, depending on context, caller identification information can include various types of data. For example, the caller identification information may identify the name of the caller, the class containing the caller, the namespace of the caller, the Class Loader of the caller, the module of the caller, permissions of the caller, and so forth. There is no limit to the types of caller information that can be added as trusted secure arguments using the techniques described herein. The manner in which the caller identification information is provided or passed to the callee while linking the caller to the callee is not critical. As described above, one technique that can be used is to append the caller sensitive information onto the operand stack. However, some operating environments may utilize virtual or processor registers in addition to or instead of an operand stack. Thus, in such embodiments, the caller sensitive information could be injected into the call by storing said information in registers or a combination of operand stack containers and registers. Furthermore, other embodiments, rather than appending the caller sensitive information onto the end of the operand stack could inject the caller sensitive information into an earlier section, such as the beginning or middle, of the operand stack.

In some embodiments, a caching system is employed so that the work done to link the caller to the callee and determine the identity of the caller can be reused for future invocations. For example, some run-time environments use a data structure referred to as a "constant pool" or "procedure linkage table" to store constants and/or configuration data for use during execution of the program, such as constant values, method entry points, and so forth. In some cases, such as with the JVM, each class has its own respective constant pool in the run-time environment. Initially, entries in the constant pool are unresolved and are resolved into actual values during execution of the program. For example, a constant pool entry may represent an invocation to "String Foo.Bar(int)" with a symbolic descriptor that indicates the invocation is to method Bar within class Foo, which takes an integer as an argument and returns a String. During resolution, the constant pool entry is linked to the call site by looking up the memory location of the code referenced by that invocation (and/or loading the class containing that code into run-time memory if not already loaded) and replacing the symbolic link with a pointer to that code. As a result, when that invocation is encountered in the future, the cached pointer can be reused rather than repeating the entire linking procedure.

In an embodiment, invocations to a caller-sensitive method cache the pointer to the method code and also the caller identification information added as an additional argument during the call. As a result, when the invocation to the caller-sensitive method is repeated by the same class, the run-time environment can avoid repeating the linking procedure. Instead, the run-time environment adds the cached caller identification information as an additional argument and then begins executing the code at the cached pointer.

In some embodiments, caller-sensitive methods are identified with metadata, such as a key word, that identifies the method as caller-sensitive. Thus, when an invocation instruction is received by the run-time environment, the run-time environment can check the metadata to determine whether the invoked method is caller-sensitive. If so, the special linking procedure is followed to provide the callee with the caller identification information. Otherwise, a standard linking procedure is followed that links the call, but does not provide the callee with the caller identification information.

In some embodiments, caller-sensitive methods are defined using two mismatching signatures. The first signature is a public definition of the method representing the form of the method invocation from the perspective of the caller. For example, the first signature might specify the name of the method, the class of the method, the caller-supplied arguments (e.g. arguments that do not contain the caller identification information), and/or the return type of the method. The second signature represents the private definition of the caller-sensitive method. Access to the private method is forbidden to untrusted callers. For example, the second signature might specify the name of the method, the class of the method, the caller-supplied arguments, one or more additional arguments representing the caller identification information, and/or the return type of the method. The run-time environment is configured to link an invocation with a descriptor corresponding to the first signature to the call site expecting a call matching the second signature. Thus, in response to encountering an invocation instruction with a descriptor matching the first signature, the run-time environment performs the special linking procedure to add the extra argument(s) expected by the second signature at the call site and then begins execution of the method code at the call site. In some embodiments, the access permissions allowed by the operating environment include public, private, but also varying degrees of restrictions in-between, such as (using Java terminology) protected and package-private. The term private is used as an example to discuss the separation of a publically accessible definition/signature from a non-publically accessible definition/signature, but the techniques described herein are not limited to the non-public signature being restricted to the "private" access permission as used in the context of Java. Thus, the term "non-public" is used to denote all types of possible access permissions that are more restrictive than the most permissive "public" access restriction.

Since the second signature is private, untrusted callers cannot directly perform an invocation with a descriptor matching the second signature. Thus, callers are prevented from subverting the security measures by supplying their own caller identification information. In cases where callers attempt a call using a descriptor matching the second signature, the run-time environment or a component thereof (such as a verifier of a virtual machine) prevents the invocation from occurring and produces an exception or error. As a result, the callers are forced to use the public signature of the caller-sensitive method and rely on the run-time environment to properly link the call and provide the missing arguments.

In some embodiments, the techniques used to provide caller identification information to the callee are genericized to pass along virtually any kind of information that would benefit from being provided by a trusted and secure source. For example, the run-time environment might add information related to usage statistics to the call, which the caller might be not be trusted (or able) to provide.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a run-time environment 113, an operating system 111, and one or more application programming interfaces (APIs) 110 that enable communication between the run-time environment 113 and the operating system 111. The run-time environment 113 includes a virtual machine 104 comprising various components, such as a memory manager 105 (which may include a garbage collector), a verifier 106 to check the validity of class files 103 and method instructions, a class loader 107 to locate and build in-memory representations of classes, an interpreter 108 for executing the virtual machine 104 code, a just-in-time (JIT) compiler 109 for producing optimized machine-level code, and a link resolver 114 for resolving symbolic references to classes and/or methods.

In an embodiment, the computing architecture 100 includes source code files 101 that contain code written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
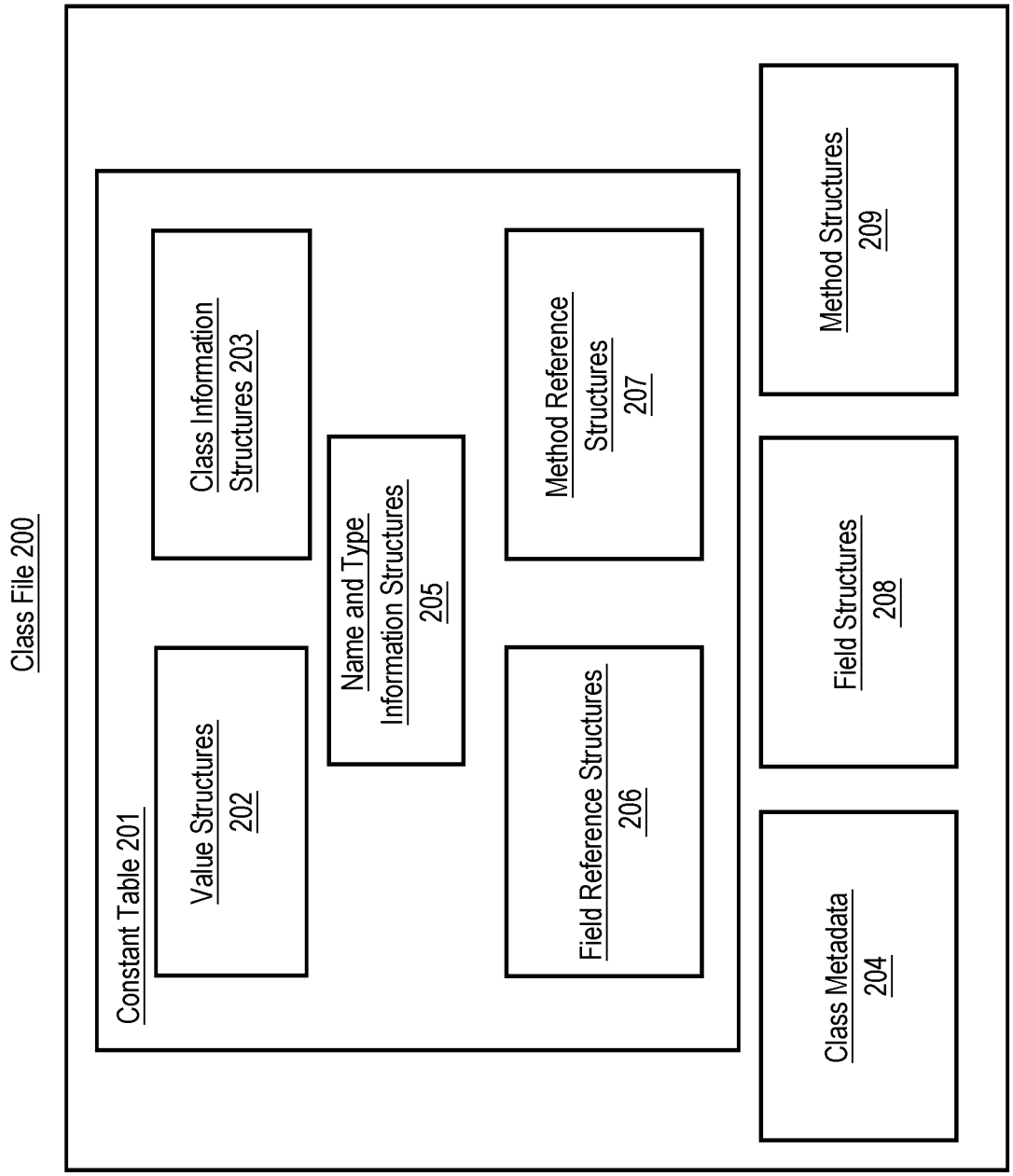
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
    int add12and13( ) {
```

```
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the run-time environment 113. As will be described in Section 2.3, eventually the run-time representation of the symbolic references are resolved into actual memory addresses by the virtual machine 104 after the referenced classes (and associated structures) have been loaded into the run-time environment and allocated concrete memory locations.

2.2 Example Virtual Machine Architecture

Figure 3:
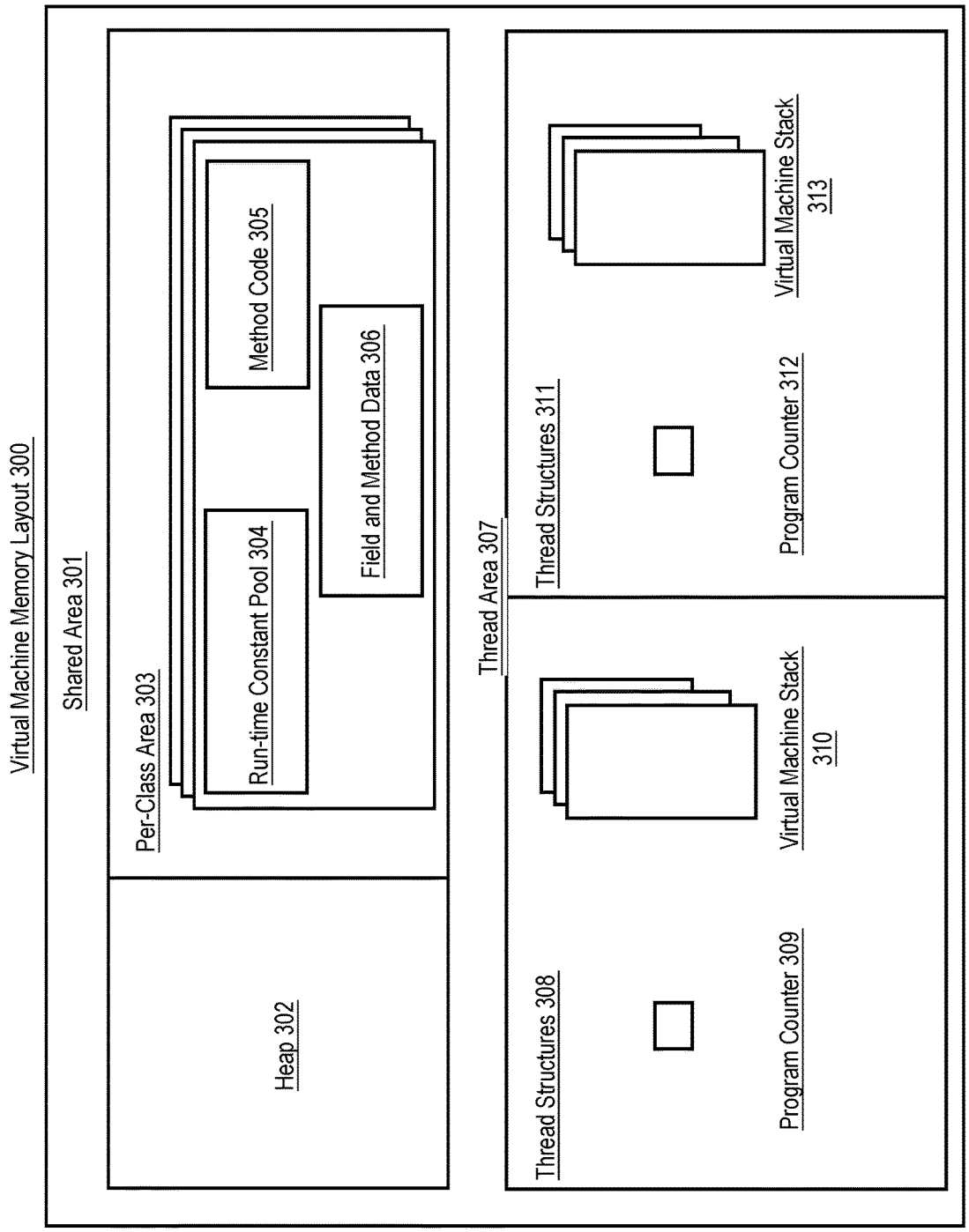
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
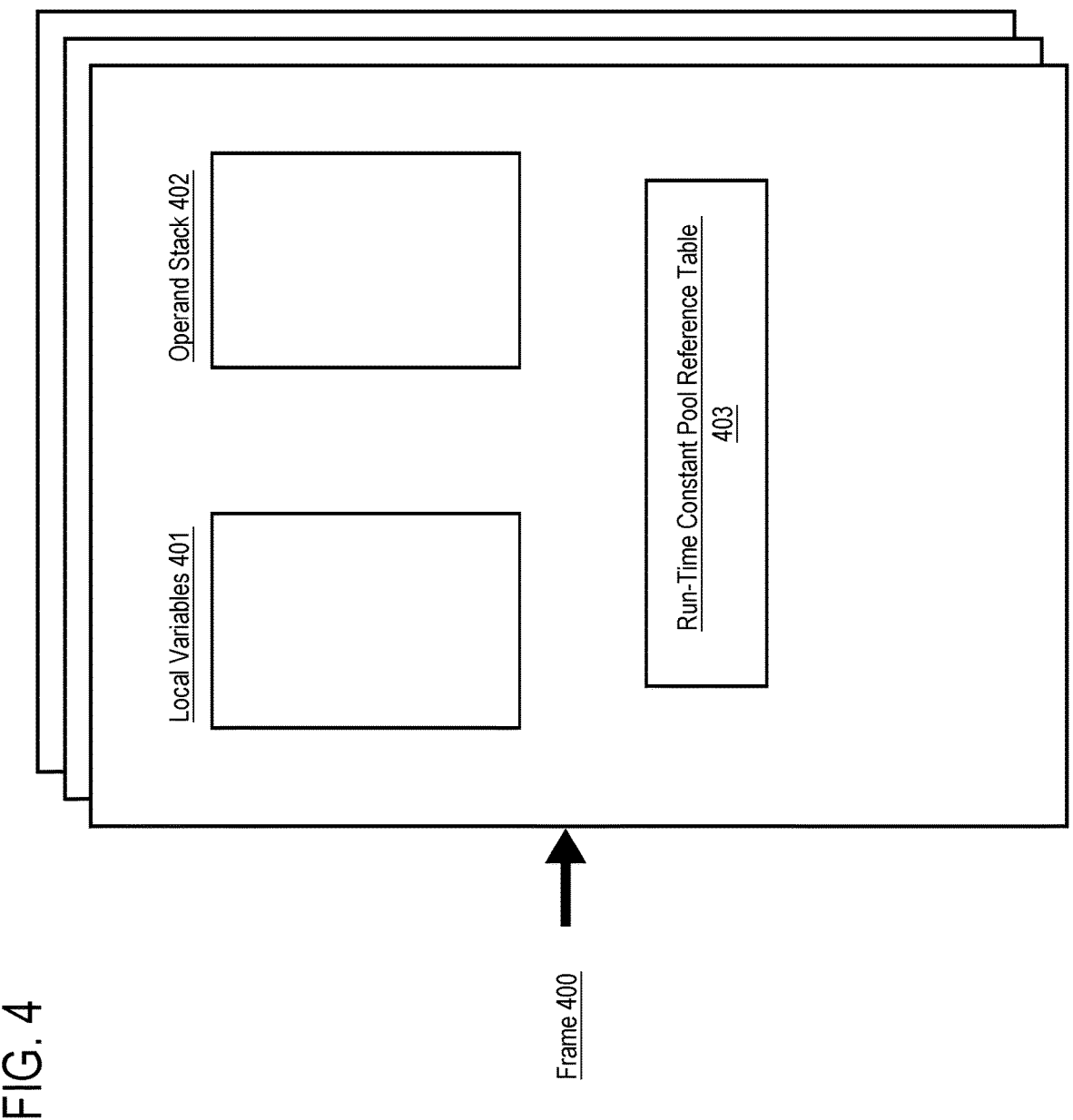
FIG. 4 illustrates an example stack frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

Although the local variables 401 and the operand stack 402 are referred to using data structures such as "arrays" and/or "stacks", there is no limit to the type of data structure used to implement those elements. In addition, the data structures referred to herein with respect to the local variables 401 and operand stack 402 relate to high level representations of the data structure. Embodiments can implement those data structures using a variety of lower level storage mechanisms, such as storing one or more values of the local variables 401 and/or the operand stack 402 in one or more registers of a central processing unit (CPU) of the machine hardware executing the virtual machine 104.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the run-time environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded).

Once loaded, the virtual machine 104 has knowledge of the memory location within the per-class area 303 of the referenced class and its fields/methods. The virtual machine 104 then passes control to the link resolver 114 which replaces the symbolic references with a reference to the concrete memory location of the referenced class, field, or method. For example, the link resolver 114 may consult metadata, tables, or other information to search and locate the concrete memory location. In an embodiment, the link resolver 114 caches resolutions to be reused in case the same class/name/descriptor is encountered again during execution of the program. In some embodiments, caching is performed by replacing the symbolic reference within the run-time constant pool 304 of the class. However, in other embodiments, a separate caching data structure is used to store pointers to the concrete memory location.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 Caller-Sensitive Method Example

Caller-sensitive methods are methods that change behavior based on the caller. The following is an example of a caller-sensitive method written in pseudo-code using terminology related to the Java programming language.

```
Class Foo
{
    @CallerSensitive private Class forName(String s, CallerInfo caller)
    {
        //return class with the name corresponding to "s" based on caller
    }
}
```

The caller sensitivity of the example method above is that the String "s" could reference different classes based on the namespace or Class Loader of the caller. Thus, knowing "s" alone is insufficient to determine which class instance should be returned. As a result, the string "s" is supplemented by CallerInfo which contains information related to the caller from which forName can derive the correct class to return. For example, CallerInfo may contain the name or a link to the Class Loader used to load the class of the caller. This example method will be referenced multiple times by the remainder of the disclosure in order to illustrate example features. However, the techniques described herein are not limited to the example provided, any particular programming language, or any particular operating environment.

In the above example, the method forName is designated as a caller-sensitive method using the keyword "@Caller-Sensitive". However, other embodiments can use virtually any keyword or syntax to designate a method as caller-sensitive. In other embodiments, rather than being designated with explicit syntax, a method can be determined to be caller-sensitive based on the arguments or code contained within the method. For example, the argument type Caller-Info might be an argument type reserved for the run-time environment 113 to pass in information about the caller. Thus, the run-time environment 113 can assume that when an argument of that type is included, the method is caller-sensitive.

In an embodiment, when the compiler 102 compiles the source code files 101 into the class files 103, caller-sensitive methods are represented in the class files 103 with a flag or other metadata that identifies the method as caller-sensitive. For example, metadata identifying the forName method as caller-sensitive can be stored within or in relation to the method structures 209 of class file 200.

4.0 General Process Flow

Figure 5:
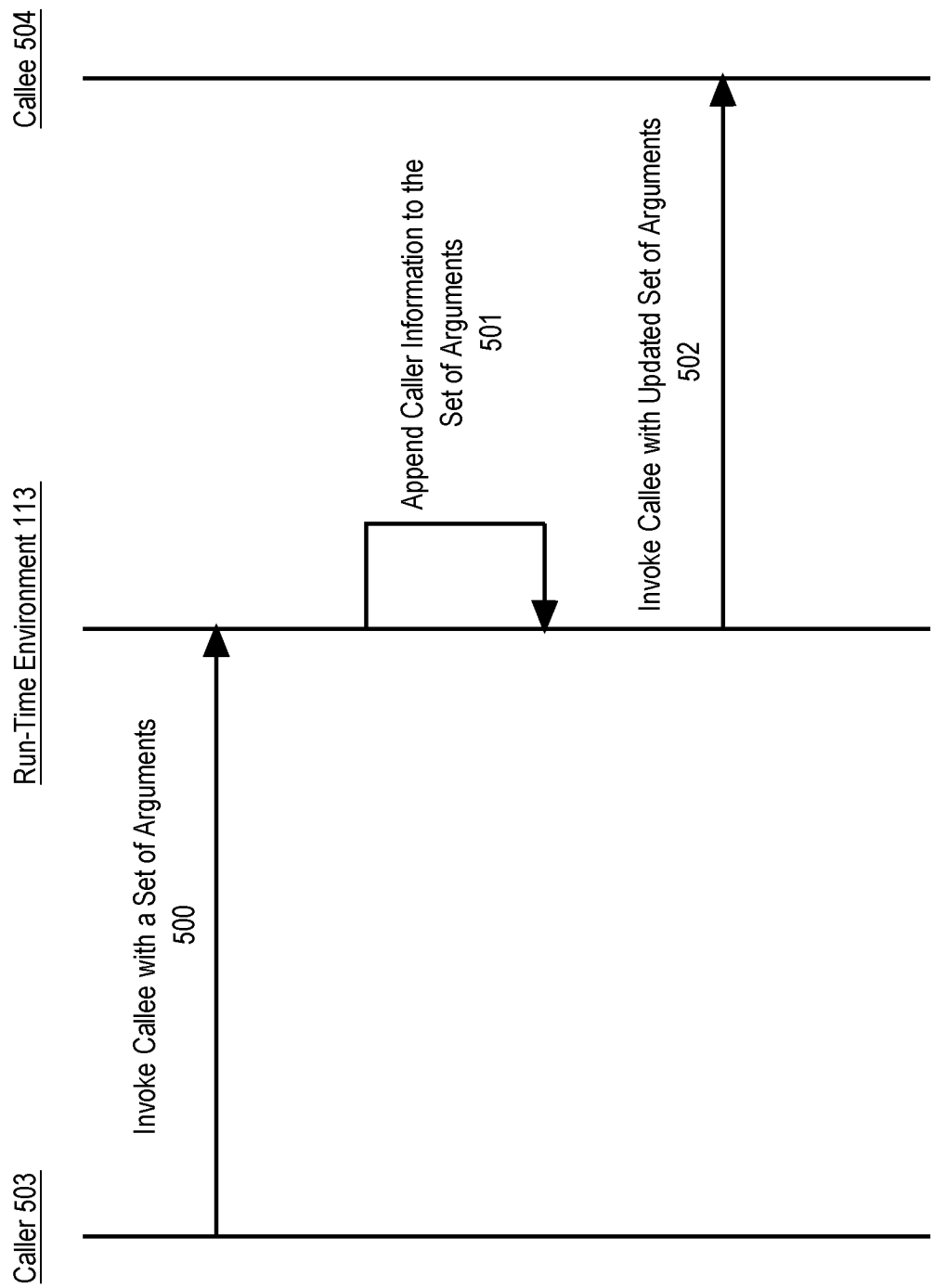
FIG. 5 illustrates an example general process flow for a calling sequence in block diagram form according to an embodiment.

FIG. 5 illustrates a general process for calling a caller-sensitive method according to an embodiment. The process illustrated in FIG. 5 is a general overview of an example linking sequence, various features and details of which are described in later sections. In FIG. 5, the caller 503 represents a method which invokes the callee 504, a caller-sensitive method.

At step 500, the caller 503 invokes the callee 504 with a set of arguments, referred to as arguments [1 . . . N]. In some embodiments, the caller 503 and the callee 504 are managed by run-time environment 113 which includes virtual machine 104 for executing those methods. Thus, even though the caller 503 and the callee 504 are illustrated as actors in FIG. 5, those elements are intended to represent a delineation between actions performed by executing code belonging to the caller 503, actions performed by executing code belonging to the callee 500, and actions performed by executing code belonging to the run-time environment 113. For example, the caller 503 may represent user code that is considered untrusted and runs under a more restricted set of privileges than code belonging to the trusted run-time environment 113.

At step 501, the run-time environment 113 appends an additional argument representing caller information to the set of arguments provided by the caller 503. In some embodiments, step 501 is performed by the run-time environment 113 pushing the caller information onto the operand stack 402 of the stack frame 400 belonging to the caller 503 before invoking the callee 504. Depending on the embodiment, the caller information can include the class of the caller 503, a superclass of the caller 503, a Class Loader of the caller 503, a namespace of the caller 503, a module of the caller 503, permissions of the caller 503, or virtually any other information related to the caller 503. In some embodiments, rather than providing the caller information in a single additional argument, multiple additional arguments representing different types of caller information are pushed onto the operand stack 402. In some embodiments, the additional arguments are added to the operand stack 402 by manipulation of the contents located at the beginning or the middle of the operand sack 402, rather than appending the arguments onto the end of the operand stack 402. In other embodiments, the operating environment uses a different structure to store operational data, such as virtual/processor registers instead of or in addition to an operand stack 402. Thus, adding the additional arguments in such embodiment may involve storing the additional arguments in said registers instead of or in addition to the operand stack 402.

At step 502, the run-time environment 113 links the call by invoking the callee 504. In some embodiments, the run-time environment 113 links the call by preparing a stack frame for the callee 504 where the local variables 401 include the [1 . . . N] arguments of the original call and an additional [N+1] argument holding the caller information. In embodiments where multiple additional arguments are pushed onto the stack frame 400 at step 501, the local variables instead hold an additional [N+1 . . . N+M] arguments, with M being the number of additional arguments pushed by the run-time environment 113. After preparing the stack frame 400 for the callee 504, the run-time environment 113 executes the code belonging to the callee 504.

Depending on the implementation of the run-time environment 113, execution of the caller 503 and the callee 504 can be performed by the interpreter 108, the JIT compiler 109, or a combination of both. For example, in the case of the interpreter 108, the virtual machine 104 steps through each instruction of the caller 503 and/or callee 504 and outputs one or more corresponding lower-level instructions for execution by the underlying hardware. As another example, in the case of the JIT compiler 109, the virtual machine 104 performs a global analysis and converts a block or blocks of instructions belonging to the caller 503 and/or callee 504 into corresponding lower-level instructions. Thus, when execution is performed using the interpreter 108, the process of FIG. 5 begins at block 500 when an instruction is read from the caller 503 that invokes the caller-sensitive callee 504. However, in the case of performing execution via code compiled by the JIT compiler 109, the process of FIG. 5 is performed during the global analysis. For example, step 500 could be performed in response to scanning an invoke instruction during the global analysis, with the run-time environment 113 adding the additional arguments at step 501 via low-level instructions generated during compilation. As a result, the process illustrated in FIG. 5 is not limited to any particular technique used to execute the caller 503 and callee 504.

5.0 Example Caching Process

As discussed earlier, the run-time constant pool 304 in the per-class area 303 of the virtual machine memory layout 300 is the run-time representation of the constant table 201 for the corresponding class. Thus, the run-time constant pool 304 holds elements such as constant values and references to other classes/methods that are utilized by the various methods of the corresponding class. In some embodiments, in the case of references to other classes/methods, the references in the run-time constant pool 304 are initially "symbolic references" or "symbolic links" which contain information that can be used by the virtual machine 104 to locate and link to the particular method that will be executed. However, in order to speed up future invocations once the reference is linked, the symbolic reference is replaced with a pointer to the linked method. Thus, the replacement of the symbolic reference effectively acts as a cache that allows the virtual machine 104 to skip the linking process for invocations using the same descriptor. In other embodiments, the virtual machine memory layout 300 contains a separate data structure for storing the cached pointers, rather than replacing entries of the run-time constant pool 304. For example, the cache could be represented as a data structure that maps descriptors to a method pointer. Thus, the method pointer would initially be null and then become updated with a pointer to the method after call is linked for the first time.

For example, when an invoke instruction is processed by the virtual machine 104, the virtual machine 104 can determine if the entry corresponding to the invoked method in the run-time constant pool 304 contains a symbolic reference or a concrete pointer. If the entry contains a symbolic reference, the virtual machine 104 loads the class containing the method (if not already loaded), locates the code belonging to the method, replaces the symbolic reference with a pointer to the code, constructs a new stack frame for the method, and begins execution of the method. However, if the entry contains a concrete pointer (indicating that linking had previously been performed), the virtual machine 104 can instead construct a new stack frame and begin execution at the code referenced by the pointer without performing the entire linking process.

In an embodiment, the caching technique described above is modified in the case of an invocation to a caller-sensitive method. In such embodiments, when a call to a caller-sensitive method is linked for the first time, the virtual machine 104 updates the entry in the run-time constant pool 304 with the caller information to add as an argument, in addition to the pointer to the referenced method. Thus, if the class calls the caller-sensitive method again at a future point during execution of the program, the virtual machine 104 adds the cached caller information as one or more additional arguments and then executes the method at the cached pointer. The representation of the caller information within the entry of the run-time constant pool 304 is not critical. For example, the entry may contain a pointer to a memory location storing the information or can be sized such that the caller information can be effectively inlined within the entry.

6.0 Caller-Sensitive Method Definitions

As a consequence of adding additional arguments while linking a call to a caller-sensitive method, some embodiments allow a mismatch between the descriptor of the invocation and the signature of the method at the call site. For example, as described above in Section 2.1, some embodiments utilize method descriptors that identify a method symbolically by name, arguments, and return type. Thus, in order to locate the callee 504, the invoke instruction of the caller 503 is supplied with the method descriptor of the callee 504 (which may be represented as an index into the run-time constant pool 304). As a result, the virtual machine 104 can locate the appropriate class and method based on the method descriptor and links the call. However, when an argument is added by the run-time environment 113 during the call, the descriptor of the method from the perspective of the caller 503 will not match the signature of the callee 504. Thus, in some embodiments, caller-sensitive methods utilize at least two different signatures, one representing the public view of the method and the other representing the private view of the method.

For example, consider the following example method signatures for the forName method, (1) @CallerSensitive public Class forName(String s)

(2) @CallerSensitive private Class forName(String s, CallerInfo caller)

In the above example, signature (1) represents the public view of the method and signature (2) represents the private view of the method. In an embodiment, the virtual machine 104 creates an association between both signatures, such that when an invoke instruction is received with a descriptor matching signature (1), the virtual machine 104 links the call to the method matching signature (2) after adding the additional argument. For example, the association could be stored as metadata associated with the caller-sensitive method, such as a special lookup table or data indicating the missing arguments to add to signature (1). As a result, even if the descriptor at the call site does not match the signature of the called method, the virtual machine 104 can still link to the correct method code. In some embodiments, in order to differentiate public/private views of a caller-sensitive method from an attempt to overload the method, the signatures are linked by using the same keyword or an organizational structure, such as being enclosed in brackets or other syntactic element.

In some embodiments, the virtual machine 104 is capable of adding multiple types of caller information while linking to a caller-sensitive method. For example, the virtual machine 104 could include code for different types of linking sequences for caller-sensitive methods, each adding a different type of argument. As another example, the code for performing the linking sequence could include a switch that branches based on the type of argument to add when linking to the caller-sensitive method. In some embodiments, the private signature of the caller-sensitive method includes information that informs the virtual machine 104 which types of caller information should be added as extra arguments while linking the call. For example, keywords included with the private signature could specify the types of caller information to add. As another example, the virtual machine 104 can utilize the declaration of the additional arguments in the private signature to determine which types of information to add while linking the call. Thus, in some embodiments, the virtual machine 104 inspects the information that determines which types of caller information to add and then follows an execution path at linkage time that adds arguments of the determined types.

7.0 Example Interpreter Process Flow

Figure 6:
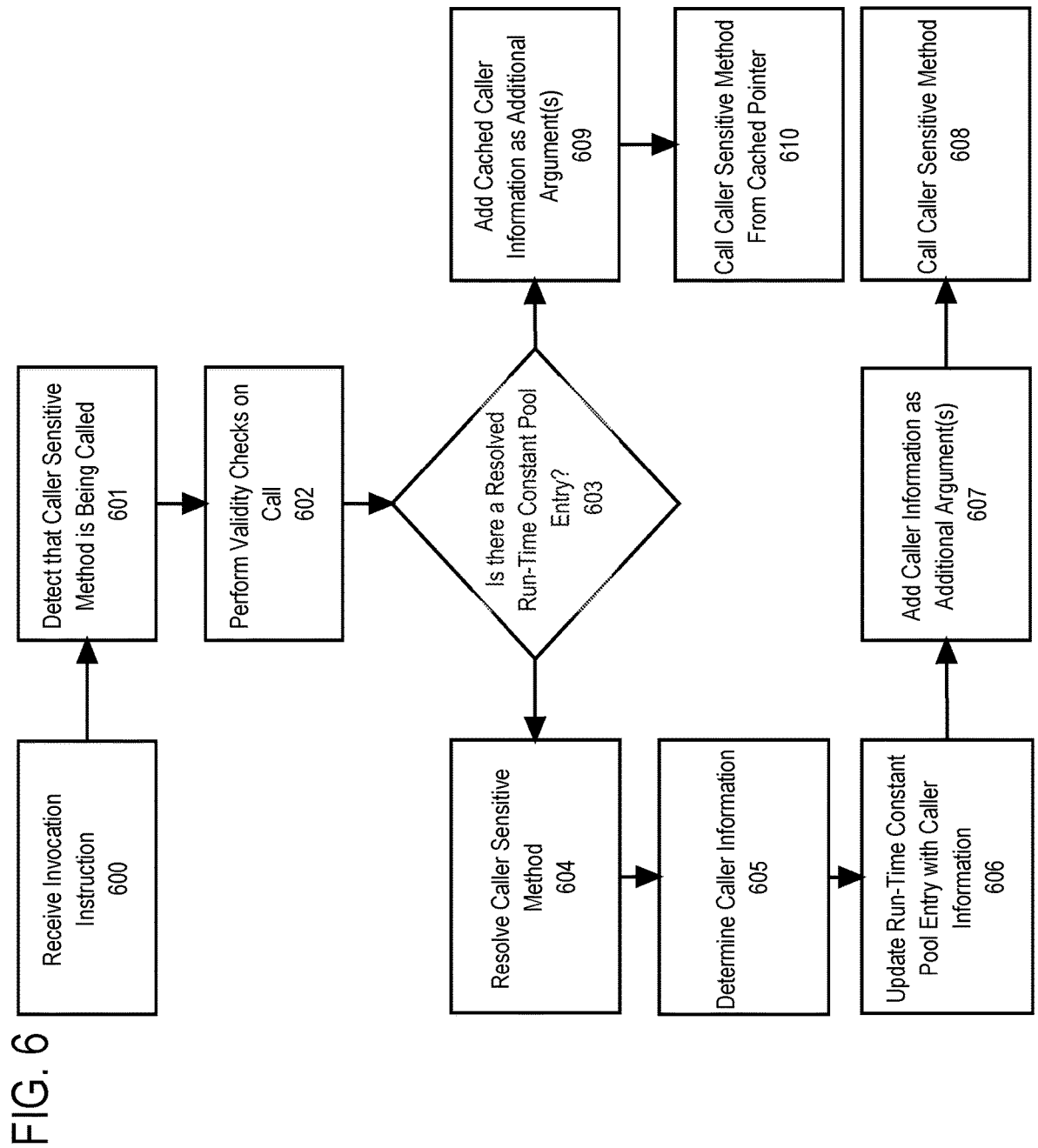
FIG. 6 illustrates an example interpreter process flow for a calling sequence in block diagram form according to an embodiment.

FIG. 6 illustrates an example interpreter process for calling a caller-sensitive method in block diagram form according to an embodiment. In order to provide clear examples, the following description assumes the process is performed by the interpreter 108 of the virtual machine 104. However, in other embodiments, the process can be performed by a different component of the run-time environment 113. For example, the process or a similar process could be performed by the JIT compiler 109. Furthermore, although the blocks of FIG. 6 are illustrated in a particular order, other embodiments can rearrange the order of the blocks, remove blocks, add blocks, or combine blocks. Thus, embodiments can differ from the exact order in which the blocks are presented in FIG. 6. The following explanation assumes that the method performing the call is the caller 503 and the method being invoked is the callee 504.

At block 600, the interpreter 108 receives an instruction from the caller 503 to call the callee 504. In an embodiment, the instruction received at block 600 is an invoke instruction that specifies an entry of the run-time constant pool 304. However, in other embodiments, the instruction directly specifies the descriptor of the callee 504, rather than an index number or offset into the run-time constant pool 304. For example, in such embodiments, the run-time constant pool 304 might be indexed by the descriptor or a hash of the descriptor in order to locate the corresponding entry.

At block 601, the interpreter 108 detects that the callee 504 is a caller-sensitive method. In an embodiment, the interpreter 108 detects that the callee 504 is a caller-sensitive method based on metadata associated with the entry of the run-time constant pool 304 referenced by the instruction. For example, entries in the run-time constant pool 304 that link to caller-sensitive methods could include a flag or other metadata that indicates the referenced method is caller-sensitive. However, in other embodiments, the metadata is stored externally to the run-time constant pool 304. For example, the interpreter 108 could inspect the class file 200 of the class containing the callee 504 to determine if the callee 504 is defined as a caller-sensitive method.

At block 602, the interpreter 108 performs one or more validity checks on the instruction received at block 600. In an embodiment, the interpreter 108 at block 600 receives an invoke instruction and at block 602 and the interpreter 108 passes the invoke instruction to the verifier 106. The verifier 106 checks the invoke instruction against a set of rules. If the instruction passes the set of rules the process continues to block 603. However, if the instruction fails one or more rules the call is blocked and the verifier 106 generates an error or exception. In an embodiment, the set of rules includes one or more of: checking the syntax of the instruction to ensure validity, checking that the instruction uses a descriptor that matches the public signature of the caller-sensitive method rather than a private signature, checking whether the caller 503 of the caller-sensitive method has sufficient privileges to access the callee 504, and so forth.

At block 603, the interpreter 108 determines whether the run-time constant pool 304 contains a resolved entry for the call. In an embodiment, the interpreter 108 checks the run-time constant pool 304 to determine whether the entry referenced by the instruction contains a symbolic link or a concrete pointer to the code of the callee 504. If the entry contains a symbolic link, the interpreter 108 passes control to the link resolver 114 at block 604. However, if the entry had previously been resolved and contains a concrete pointer to the callee 504, the interpreter 108 instead proceeds to block 608. In other embodiments, the virtual machine memory layout 300 includes a separate cache data structure for caching resolutions of symbolic links. As a result, in such embodiments, the interpreter 108 checks entries of the cache data structure instead of the entries of the run-time constant pool 304.

At block 604, the link resolver 114 resolves the call to the caller-sensitive method. In an embodiment, the link resolver 114 performs resolution of the symbolic link by inspecting the descriptor of the call and identifying the class containing the callee 504. If the class is not already loaded, the link resolver 114 passes control to the class loader 107 to load the class into run-time memory. Once the class is loaded, or if the class is already loaded, the link resolver 114 finds a method signature defined within the class that matches the descriptor of the call. In some embodiments, caller-sensitive methods have a public signature and a private signature. In such embodiments, the link resolver 114 finds the matching public signature, discovers the private signature associated with that public signature, and identifies the memory address of the method code associated with the private signature. The link resolver 114 then updates the entry of the run-time constant pool 304 with a concrete pointer that leads to the identified memory address.

At block 605, the link resolver 114 determines the identity of the caller 503 and derives the required caller information. In some embodiments, the link resolver 114 may consult metadata associated with the callee 504 to determine how to compute the additional caller information, and based on that metadata compute that information as part of the process of link resolution. For example, the caller sensitive callee 504 may be associated with an argument resolution function (or "bootstrap function") which, when executed, produces caller-related information specifically required by the callee 504. As another example, the link resolver 114 may compare the public and private signature of the call and determine that arguments in the private signature that are missing from the public signature represent caller sensitive information. In some embodiments, the caller-related information is made available as part of the result of the link resolution. In some embodiments, the metadata also specifies the order in which the different types of caller information should be added, and thus the order in which the arguments will ultimately appear as local variables 401 to the callee 504. The link resolver 114 then returns control to the interpreter 108 at block 606.

At block 606, the interpreter 108 updates the corresponding entry of the run-time constant pool 304 with the caller information determined at block 605. However, in other embodiments, the interpreter 108 may store the cached caller information in a separate memory location, such as the heap 302, and store a pointer to the cached caller information in the entry. Thus, in some embodiments, in addition to the method pointer added by the link resolver 114, the entry of the run-time constant pool 304 is also used to store the caller information or a reference thereto. In an embodiment, the interpreter 108 keeps track of the current state of execution, such as the method currently being executed, the class of the method currently being executed, the current Class loader, the current module, and so forth. As a result, in cases where such information is to be added to the call, the interpreter 108 is able to locate that information efficiently. For example, in the case of execution via the interpreter 108, thread structures 308 and thread structures 311 could store the above information with respect to the execution of their respective threads.

At block 607, the interpreter 108 adds information related to the caller 503 as an additional argument to the call. In some embodiments, the caller information to be appended is retrieved from the corresponding entry of the run-time constant pool 304 that was updated at block 606. In an embodiment, the interpreter 108 adds the caller information determined at block 605 to the call by pushing the caller information onto the operand stack 402 prior to constructing a new stack frame 400 for the callee 504. However, in other embodiments, the interpreter 108 may add more than one argument, where each added argument represents a different type of caller information. In some embodiments, the additional argument(s) are added to the operand stack 402 by manipulating of the contents located at the beginning or middle of the operand stack 402, rather than appending the arguments onto the end of the operand stack 402. In other embodiments, the operating environment uses a different structure to store operational data, such as virtual/processor registers instead of or in addition to an operand stack 402. Thus, adding the additional arguments in such embodiment may involve storing the additional arguments in said registers instead of or in addition to the operand stack 402.

In some embodiments, the interpreter 108 pushes the caller information onto the operand stack 402 by value. However, in other embodiments, the interpreter 108 pushes the caller information onto the operand stack 402 by reference. In still other embodiments, the interpreter 108 performs a determination as to whether it is more efficient to store the caller information by reference or by value for each type of caller information determined at block 605. For example, if the caller information is a type that can fit into a pre-existing container of the operand stack 402 then the interpreter 108 may choose to store the caller information by value. However, if the caller information is too large to fit into a container of the operand stack 402 without significant reallocation of memory, the interpreter 108 may choose to store the caller information in a separate memory area (such as the heap 302) and push a reference to the caller information onto the operand stack 402. In still other embodiments, the determination is made based on whether the caller information to be added is a primitive type (passed by value) or a reference type (passed by reference).

At block 608, the interpreter 108 invokes the caller-sensitive method. In an embodiment, the interpreter 108 invokes the callee 504 by creating a new stack frame 400 for the execution of the callee 504. The local variables 401 of the new stack frame are created by popping the contents of the operand stack 402 of the previous stack frame. Thus, the local variables 401 include the original arguments to the call as well as the additional arguments added at block 605. However, in embodiments which use overlapping stack frames, the position of the operand stack 402 in the previous frame may be used as the local variables 401 of the new frame.

At block 609, the interpreter 108 adds the cached caller information as an additional argument. In an embodiment, when the interpreter 108 discovers that a resolved entry exists for the call in the run-time constant pool 304, the interpreter 108 pushes the cached caller information from the entry onto the operand stack 402. As with block 607, the cached caller information may be passed by value or by reference depending on the embodiment.

At block 610, the interpreter 108 invokes the caller-sensitive method based on caller the pointed cached in the constant pool reference table entry. In an embodiment, the interpreter 108 constructs a new stack frame 400 for the execution of the callee 504 (such as described in relation to block 608) then begins execution of the code located at the cached pointer within the entry.

8.0 Example Compiler Process Flow

Figure 7:
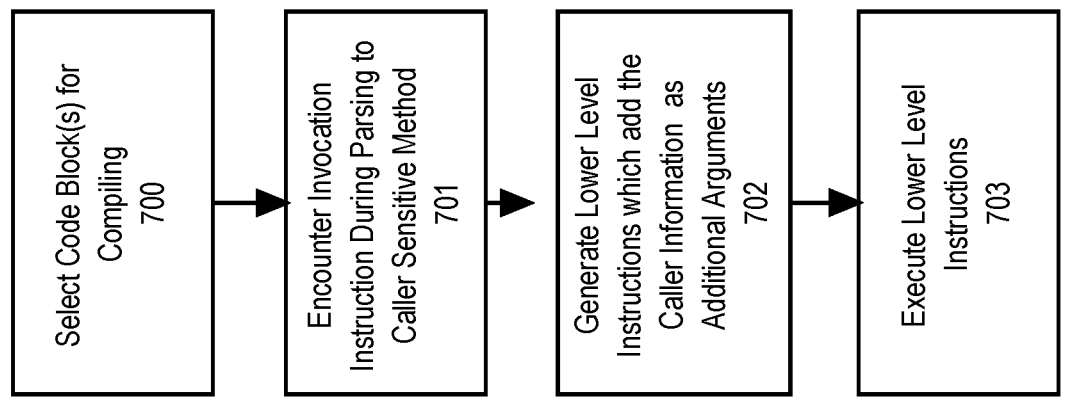
FIG. 7 illustrates an example compiler process flow for a calling sequence in block diagram form according to an embodiment.

The previous explanation of FIG. 6 assumes that the steps are performed by the interpreter 108. However, in other embodiments, a calling sequence for caller-sensitive methods which adds run-time secured caller information can be performed while executing lower-level instructions compiled by a compiler, such as the JIT compiler 109. FIG. 7 is a block diagram that illustrates a calling sequence for caller-sensitive methods using a compiler according to an embodiment. Although the blocks of FIG. 7 are illustrated in a particular order, other embodiments can rearrange the order of the blocks, remove blocks, add blocks, or combine blocks. Thus, embodiments can differ from the exact order in which the blocks are presented in FIG. 7.

At block 700, the virtual machine 104 selects a block (or blocks) of code for compiling. In an embodiment, the virtual machine 104 stores metadata that tracks how many times each method is executed. For example, the virtual machine 104 may store a counter in association with invoke instructions which keep track of how many times one method calls another. When the metadata indicates that a particular block or blocks of code have been executed a threshold number of times or a with a threshold frequency, the virtual machine 104 selects the block(s) of code for compiling. In order to illustrate a clear example, the remainder of the explanation of FIG. 7 assumes that the caller 503 and the callee 504 have been selected for compiling. Once the block(s) of code have been selected for compiling, the virtual machine 104 passes control to the JIT compiler 109 to perform the compilation.

At block 701, the JIT compiler 109, while parsing the block(s) of code of the caller 503, detects an invocation instruction that calls the callee 504, a caller-sensitive method. For example, the JIT compiler 109 may read an invoke instruction that includes a reference to the callee 504, such as the descriptor matching the public signature of the callee 504. The JIT compiler 109 then consults metadata associated with the descriptor, such as metadata stored in the run-time constant pool 304 and/or the class file 200 of the callee 504, to determine if the callee 504 is caller-sensitive. If the JIT compiler 109 determines that the callee 504 is caller-sensitive, the JIT compiler 109 proceeds to block 702. However, if the JIT compiler 109 determines that the callee 504 is not caller-sensitive, than a standard compilation procedure is followed. For example, the JIT compiler 109 may produce optimized lower-level instructions which do not include instructions for loading caller information for use by instructions generated by the callee 504.

At block 702, the JIT compiler 109 generates low-level instructions that perform the actions of the caller 503 and the callee 504. Furthermore, while generating the low-level instructions, the JIT compiler 109 includes additional instructions which load caller information of the caller 503 for use by instructions attributable to the callee 504. For example, one common optimization that is performed during compiling is inlining, which removes invocations by moving the code of the callee 504 up into the caller 503. As a result, many of the steps that would otherwise be performed to link the call can be omitted. However, in the case of caller-sensitive methods, the instructions attributable to the callee 504 might still utilize the caller information that is expected to be added by the run-time environment. Thus, in order to unify the instructions attributable to the caller 503 and the instructions attributable to the callee 504, the JIT compiler 109 includes instructions which load the caller information for use by the instructions attributable to the callee 504 or otherwise makes the caller information available to said instructions. For example, the JIT compiler 109 may generate instructions which store the caller information in one or more variables for use by the instructions attributable to the callee 504.

At block 603, the virtual machine 104 executes the compiled lower-level instructions generated at block 602. In an embodiment, once compilation is complete, control passes back to the virtual machine 104 at block 603. For example, the virtual machine 104 may stop execution while the block(s) of code are being compiled by the JIT compiler 109. However, in some embodiments, the JIT compiler 109 executes on a separate thread from other components of the virtual machine 104, such as the interpreter 108, thus allowing the virtual machine 104 to continue executing the program while the block(s) of code are being compiled. Thus, in such embodiments, while the compilation is ongoing, execution of the block(s) of code continues via the interpreter 108 using the calling sequence described in FIG. 6. However, when the JIT compiler 109 has completed execution, future executions of the block(s) of code are performed using the compiled lower-level instructions.

9.0 Other Use Cases

In the previous sections, examples of calling sequences for caller-sensitive methods are described. Thus, the additional information that is added during the call by the run-time environment 113 relates to the identity or other properties of the caller. However, in other embodiments, the added information can be any arbitrary type of information that is secured by the run-time environment 113. Thus, in other embodiments, the processes depicted in FIG. 5, FIG. 6, and FIG. 7 are generalized to provide other types of run-time secured information to the callee 504 without relying on the possibly insecure caller 503 to provide that information. For example, in FIG. 6, instead of adding caller information at block 605 or block 608, the interpreter 108 could instead add other types of information, such as usage statistics, that the caller 503 might not be able or trusted to supply. Furthermore, some types of run-time secured information could be usefully added to a call, even in cases where the callee is not caller-sensitive. Thus, in some embodiments, determinations described previously as checking the caller for caller-sensitivity, are instead replaced with determining whether the called method is associated with metadata indicating that one or more types of run-time secured information are to be added by the run-time environment 113 during the call.

Since arbitrary metadata can be injected into the call. The metadata could observe the flows of arguments and return types, and deduce the ability to return a cached copy of a result from a previous computation. Many methods use some sort of caching (or "short circuit" logic) for better speed. Each affected method has an associated cache, but associating the caching logic to the caller (by injecting a per-call-site argument), can increase caching efficiency since caches can then store different answers for different callers, rather than one generic answer for all callers.

10.0 Alternatives for Specifying the Additional Arguments

In the examples provided above, the mechanism used to specify which types of caller information to inject (and potentially in which order) is described by a public and private version of the signature of the callee 504. Thus, the virtual machine 104 is capable of reading the signatures and injecting arguments that are specified by the private signature but missing from the public signature. However, there are many types of mechanisms and/or metadata that may be employed to specify which types of caller information to inject when linking the caller 503 with the callee 504. A few examples are provided below.

In an embodiment, the definition of the callee 504 includes one or more annotations which identify the caller information to inject at link time. Annotations are flags or keywords that are added to code (such as the method definition of the callee 504), which represent information that the compiler 102 and/or virtual machine 104 can use to perform various tasks. Annotations are often identified by use of a specific symbol, such as "@", to denote the start of an annotation followed by the keyword(s) identifying the type of annotation. For example, in Java, @Override instructs the compiler to check parent classes for matching methods and generate an error if no matching class is found. As a result, if @Override is included in the source code of the method, this acts as a flag to the compiler 102 to ensure that the method actually overrides a matching method of one of its parents. In the present case, annotations may be defined separately for each type of caller information (e.g. @AddParentClass, @AddClassLoader, etc.) or the annotation may be configured to take multiple values, such as @ExtraParams(ParentClass, ClassLoader, . . . ). As a result, during link time the virtual machine 104 can inspect the annotations associated with the callee 504 and identify which types of caller information will be appended, for instance, at block 605 of FIG. 6. In some embodiments, annotations can be custom designed in the source code files 101 or elsewhere and may be associated with data and/or metadata defining the annotations, such as when the annotations can be used (e.g. compile-time, run-time, etc.), restrictions on language elements to which the annotation can be applied (e.g. only methods, only fields, etc.), and so forth. In some embodiments, the one or more annotations also indicate an order to inject the caller information. For example, the order in which the annotations appear may indicate the order in which the caller information identified by those annotations will be appended. As another example, each annotation may be associated with an ordering or position number indicating the order to append the caller information. As yet another example, in cases where an annotation includes multiple values, the order in which the values appear within the annotation may specify the order in which to inject the values.

In an embodiment, the caller information is added via a bootstrap method specified by metadata associated with the callee. Bootstrap methods represent a set of instructions which are invoked in order to link the caller 503 with the callee 504. For example, in Java bootstrap methods are used to implement the invokedynamic instruction which invokes runtime logic that efficiently selects a target method and links the call. Subsequent calls invoke the target method without having to re-bootstrap, such as by caching a reference to the called method and reusing that reference for subsequent calls.

In this case, the bootstrap method is used to rectify the mismatching between the descriptor used at the call site of the caller 503 and the signature of the callee 504. Ordinarily, the virtual machine 104 would inspect the class file defining the callee 504 and find a method that matches the name and arguments invoked at the call site of the caller 503. However, in cases where the virtual machine 104 injects additional information during the call, the descriptor at the call site and the method signature of the callee would not match. Thus, in some embodiments, the bootstrap method is configured to locate a method in the callee 504 matching the name of the method called at the call site of the caller 503 and injects one or more instances of caller information to rectify the mismatch. However, other mechanisms could also be used to find the corresponding signature defining the callee 504, such as including metadata in the class file of the callee 503 that indicates the potential descriptors to which the callee 504 corresponds. The bootstrap method can be implemented in many different ways, such as having the virtual machine 104 pre-define bootstrap methods to use, allowing the compiler 102 to inject bootstrap methods when the source code files 101 are processed, or allowing the bootstrap method to be defined within the source code files 101. For example, the callee 504 may be defined within the source code files 101 (and subsequently within the class file for the containing class) to use a specific bootstrap method, such as by metadata associated with the callee 504 (e.g. annotations, references to the bootstrap method, and so forth). Thus, when the virtual machine 104 invokes the callee 504 (at least for the first time), the call is linked and/or resolved by executing the associated bootstrap method which injects the caller information and then invokes the callee 504.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
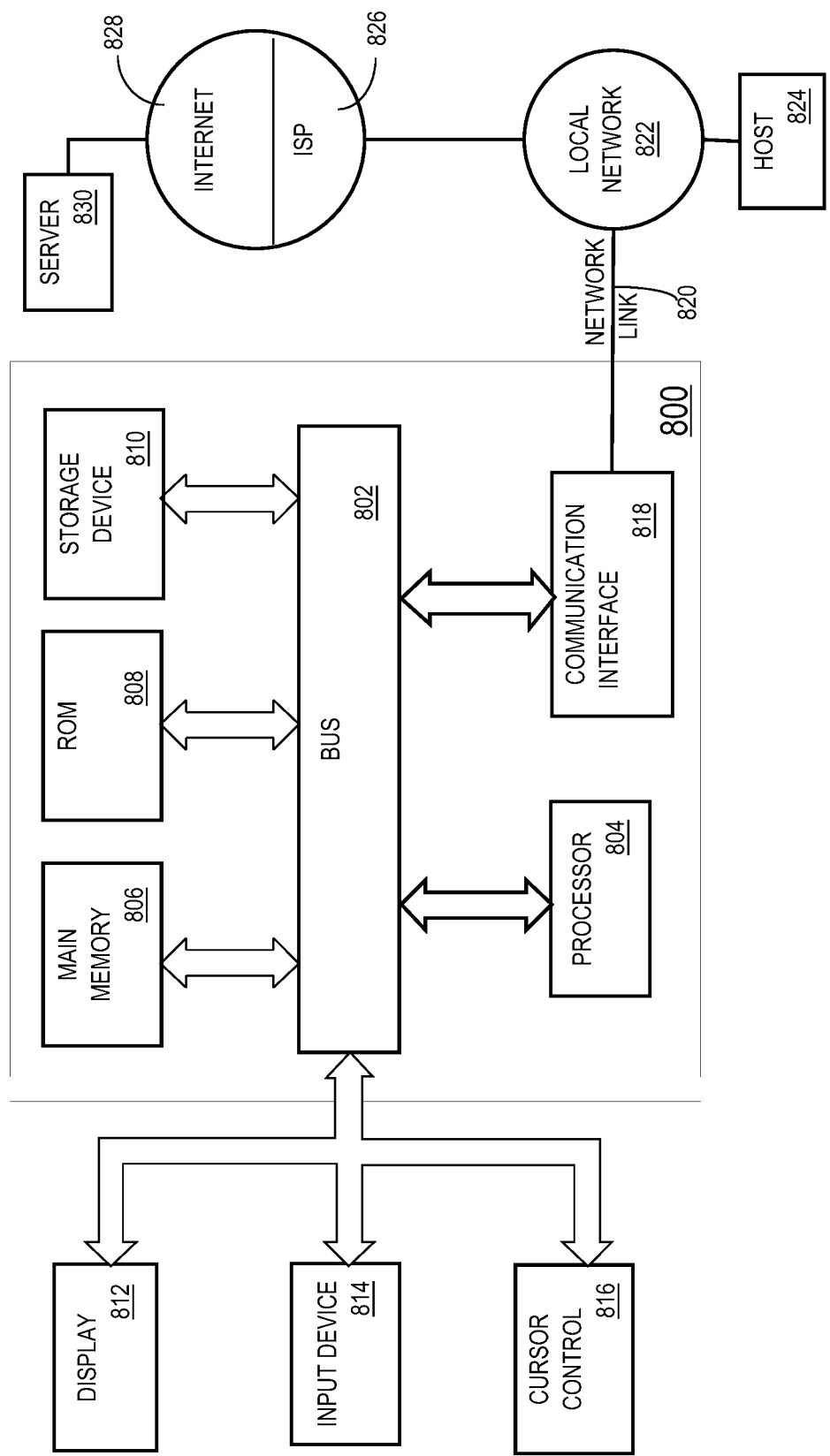
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a light emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

12.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

13.0 First Additional Disclosure

Aspects of the subject matter described herein are set out in the following numbered clauses:

1. A method comprising: a virtual machine receiving an invocation instruction from a caller that invokes a callee, wherein the caller represents a first set of instructions and the callee represents a second set of instructions, wherein the invocation instruction is associated with a first set of arguments; in response to receiving the invocation instruction and determining that the callee requires one or more additional arguments that are to be supplied by the virtual machine and are specified by metadata associated with the callee, the virtual machine causing the one or more additional arguments specified by the metadata to be added to the first set of arguments to create a second set of arguments; wherein the virtual machine prevents the caller from providing the one or more additional arguments that are to be supplied by the virtual machine; the virtual machine invoking the callee using the second set of arguments; wherein the method is performed by one or more computing devices.

2. The method of Clause 1, wherein the virtual machine causes the one or more additional arguments to be appended to the first set of arguments to create the second set of arguments by pushing the one or more additional arguments onto an operand stack for the caller that contains the first one or more arguments.

3. The method of any of Clauses 1-2, wherein the callee is a caller-sensitive method and the one or more additional arguments includes at least one parameter containing information related to the caller.

4. The method of any of Clauses 1-3, wherein the invocation instruction references an entry of a run-time constant pool and further comprising: the virtual machine determining whether the entry of the run-time constant pool is a resolved entry that contains a concrete memory location of the callee and one or more cached arguments or an unresolved entry that contains a symbolic link to the callee; in response to determining that the entry of the run-time constant pool is an unresolved entry, the virtual machine identifying a memory location of the callee based on the symbolic link and updating the entry with the memory location and contents of the one or more additional arguments, wherein the second set of instructions is located at the memory location, wherein the virtual machine invokes the callee by executing the second set of instructions located at the memory location; in response to determining that the entry of the run-time constant pool is a resolved entry, the virtual machine causing the one or more additional arguments to be added to the first set of arguments to create the second set of arguments by adding the one or more cached arguments to the first set of arguments, and the virtual machine invoking the callee by executing the second set of instructions located at the concrete memory location.

5. The method of any of Clauses 1-4, wherein the callee is defined using a public signature and a corresponding non-public signature, the invocation instruction references a descriptor, and further comprising: in response to the virtual machine receiving the invocation instruction, the virtual machine determining a memory location for the second set of instructions by searching for the public signature that matches the descriptor, locating the corresponding non-public signature based on the public signature, and identifying the memory location based on the non-public signature, wherein the virtual machine invokes the callee based on the memory location.

6. The method of any of Clauses 1-5, wherein the invocation instruction from the caller references a descriptor identifying the first set of arguments and the callee is defined using a signature that identifies the second set of arguments that includes both the first set of arguments and the one or more additional arguments.

7. The method of any of Clauses 1-6, wherein the metadata comprises a private signature of the callee that identifies the second set of arguments and a public signature of the callee that identifies the first set of arguments.

8. The method of any of Clauses 1-7, wherein the metadata comprises one or more annotations associated with the callee that identify the one or more additional arguments.

9. A method comprising: receiving an invocation instruction from a caller that invokes a callee, wherein the caller represents a first set of instructions and the callee represents a second set of instructions, wherein the invocation instruction is associated with a first set of arguments; in response to receiving the invocation instruction and determining that the callee is code whose behavior changes based on information related to the caller, causing the information related to the caller to be added as one or more additional arguments to the first set of arguments to create a second set of arguments by invoking a bootstrap function associated with the callee that links the caller to the callee and injects the one or more additional arguments; invoking the callee using the second set of arguments; wherein the method is performed by one or more computing devices.

10. The method of Clause 9, further comprising: determining one or more types of caller information to add as the one or more additional arguments based on metadata associated with the callee.

11. The method of any of Clauses 9-10, wherein determining that the callee is code whose behavior changes based on the information related to the caller is performed by inspecting metadata associated with the callee which represents a reference to the bootstrap function.

12. The method of any of Clauses 9-11, wherein the information related to the caller is one or more of: a name of the caller, a class containing the caller, a namespace of the caller, a class loader of the caller, a module of the caller, or one or more permissions of the caller.

13. The method of any of Clauses 9-12, wherein causing the information related to the caller to be appended as one or more additional arguments to the first set of arguments to create the second set of arguments is performed by pushing the one or more additional arguments onto an operand stack for the caller.

14. The method of any of Clauses 9-13, wherein the invocation instruction references an entry of a run-time constant pool and further comprising: determining whether the entry of the run-time constant pool is a resolved entry that contains a concrete memory location of the callee and one or more cached parameters or an unresolved entry that contains a symbolic link to the callee; in response to determining that the entry of the run-time constant pool is an unresolved entry, identifying a memory location of the callee based on the symbolic link and updating the entry with the memory location and contents of the one or more additional arguments, wherein the second set of instructions is located at the memory location, wherein invoking the callee is performed by executing the second set of instructions located at the memory location; in response to determining that the entry of the run-time constant pool is a resolved entry, causing the one or more additional arguments to be appended to the first set of arguments to create the second set of arguments by appending the one or more cached parameters to the first set of arguments and invoking the callee by executing the second set of instructions located at the concrete memory location.

15. The method of any of Clauses 9-14, wherein the invocation instruction from the caller uses a descriptor identifying the first set of arguments and the callee is defined using a signature that identifies the second set of arguments that includes both the first set of arguments and the one or more additional arguments.

16. One or more non-transitory computer-readable media storing instructions that, when executed by one or more computing devices, causes performance of any one of the methods recited in Clauses 1-15.

17. A system comprising one or more computing devices comprising components, implemented at least partially by computing hardware, configured to implement the steps of any one of the methods recited in Clauses 1-16.

What is claimed is:

1. A method comprising:
    a virtual machine receiving an invocation instruction from a caller function that invokes a callee, wherein the caller function represents a first set of instructions and the callee represents a second set of instructions, wherein the invocation instruction is associated with a first set of arguments;
    in response to receiving the invocation instruction and detecting, based on metadata that describes the callee, that the callee requires one or more additional arguments whose values are to be supplied by the virtual machine and whose types are specified by said metadata that describes the callee, the virtual machine causing the one or more additional arguments specified by the metadata to be added to the first set of arguments to create a second set of arguments;
    wherein the virtual machine prevents, based on said metadata that describes the callee, the caller function from providing said values for the one or more additional arguments that are to be supplied by the virtual machine;
    the virtual machine invoking the callee using the second set of arguments;
    wherein the method is performed by one or more computing devices.

2. The method of claim 1, wherein the virtual machine causes the one or more additional arguments to be appended to the first set of arguments to create the second set of arguments by pushing the one or more additional arguments onto an operand stack for the caller function that contains the first set of arguments.

3. The method of claim 1, wherein the callee is a caller-sensitive method and the one or more additional arguments includes at least one parameter containing information related to the caller function.

4. The method of claim 1, wherein the invocation instruction references an entry of a run-time constant pool and further comprising:
    the virtual machine determining whether the entry of the run-time constant pool is a resolved entry that contains a concrete memory location of the callee and one or more cached arguments or an unresolved entry that contains a symbolic link to the callee;
    in response to determining that the entry of the run-time constant pool is an unresolved entry, the virtual machine identifying a memory location of the callee based on the symbolic link and updating the entry with the memory location and contents of the one or more additional arguments, wherein the second set of instructions is located at the memory location, wherein the virtual machine invokes the callee by executing the second set of instructions located at the memory location;
    in response to determining that the entry of the run-time constant pool is a resolved entry, the virtual machine causing the one or more additional arguments to be added to the first set of arguments to create the second set of arguments by adding the one or more cached arguments to the first set of arguments, and the virtual machine invoking the callee by executing the second set of instructions located at the concrete memory location.

5. The method of claim 1, wherein the callee is defined using a public signature and a corresponding non-public signature, the invocation instruction references a descriptor, and further comprising:
    in response to the virtual machine receiving the invocation instruction, the virtual machine determining a memory location for the second set of instructions by searching for the public signature that matches the descriptor, locating the corresponding non-public signature based on the public signature, and identifying the memory location based on the non-public signature, wherein the virtual machine invokes the callee based on the memory location.

6. The method of claim 1, wherein the invocation instruction from the caller function references a descriptor identifying the first set of arguments and the callee is defined using a signature that identifies the second set of arguments that includes both the first set of arguments and the one or more additional arguments.

7. The method of claim 1, wherein the metadata comprises a private signature of the callee that identifies the second set of arguments and a public signature of the callee that identifies the first set of arguments.

8. The method of claim 1, wherein the metadata comprises one or more annotations associated with the callee that identify the one or more additional arguments.

9. The method of claim 1 further comprising in-lining said second set of instructions into said first set of instructions.

10. The method of claim 1 wherein the callee is an overloaded function.

11. A non-transitory computer-readable storage medium storing one or more instructions which, when executed by one or more processors, cause:

a virtual machine receiving an invocation instruction from a caller function that invokes a callee, wherein the caller function represents a first set of instructions and the callee represents a second set of instructions, wherein the invocation instruction is associated with a first set of arguments;

in response to receiving the invocation instruction and detecting, based on metadata that describes the callee, that the callee requires one or more additional arguments whose values are to be supplied by the virtual machine and whose types are specified by said metadata that describes the callee, the virtual machine causing the one or more additional arguments specified by the metadata to be added to the first set of arguments to create a second set of arguments;

wherein the virtual machine prevents, based on said metadata that describes the callee, the caller function from providing said values for the one or more additional arguments that are to be supplied by the virtual machine;

the virtual machine invoking the callee using the second set of arguments.

12. The non-transitory computer-readable storage medium of claim 11, wherein the virtual machine causes the one or more additional arguments to be appended to the first set of arguments to create the second set of arguments by pushing the one or more additional arguments onto an operand stack for the caller function that contains the first set of arguments.

13. The non-transitory computer-readable storage medium of claim 11, wherein the callee is a caller-sensitive method and the one or more additional arguments includes at least one parameter containing information related to the caller function.

14. The non-transitory computer-readable storage medium of claim 11, wherein the invocation instruction references an entry of a run-time constant pool, and the one or more instructions further cause:

the virtual machine determining whether the entry of the run-time constant pool is a resolved entry that contains a concrete memory location of the callee and one or more cached arguments or an unresolved entry that contains a symbolic link to the callee;

in response to determining that the entry of the run-time constant pool is an unresolved entry, the virtual machine identifying a memory location of the callee based on the symbolic link and updating the entry with the memory location and contents of the one or more additional arguments, wherein the second set of instructions is located at the memory location, wherein the virtual machine invokes the callee by executing the second set of instructions located at the memory location;

in response to determining that the entry of the run-time constant pool is a resolved entry, the virtual machine causing the one or more additional arguments to be added to the first set of arguments to create the second set of arguments by adding the one or more cached arguments to the first set of arguments, and the virtual machine invoking the callee by executing the second set of instructions located at the concrete memory location.

15. The non-transitory computer-readable storage medium of claim 11, wherein the callee is defined using a public signature and a corresponding non-public signature, the invocation instruction references a descriptor, and the one or more instructions further cause:

in response to the virtual machine receiving the invocation instruction, the virtual machine determining a memory location for the second set of instructions by searching for the public signature that matches the descriptor, locating the corresponding non-public signature based on the public signature, and identifying the memory location based on the non-public signature, wherein the virtual machine invokes the callee based on the memory location.

16. The non-transitory computer-readable storage medium of claim 11, wherein the invocation instruction from the caller function references a descriptor identifying the first set of arguments and the callee is defined using a signature that identifies the second set of arguments that includes both the first set of arguments and the one or more additional arguments.

17. The non-transitory computer-readable storage medium of claim 11, wherein the metadata comprises a private signature of the callee that identifies the second set of arguments and a public signature of the callee that identifies the first set of arguments.

18. The non-transitory computer-readable storage medium of claim 11, wherein the metadata comprises one or more annotations associated with the callee that identify the one or more additional arguments.

* * * * *